Patented Aug. 7, 1945

2,381,314

UNITED STATES PATENT OFFICE 2,381,314

MANUFACTURE OF GREASES FROM GREASE BASES

William H. Shields, Cincinnati, Ohio, assignor to Emery Industries, Inc., Cincinnati, Ohio, a corporation of Ohio No Drawing. Application March 6, 1942, Serial No. 433,674

2 Claims. (Cl. 252—39)

This invention relates to the manufacture of greases and it is directed particularly to a method of making greases by incorporating in a suitable mineral oil a grease base of the type shown in the Myers United States Patent No. 2,151,641. Such greases are of the anhydrous variety as distinguished from the emulsion type greases and it is desirable that a suitable degree of firmness be provided with the use of as little base as possible.

A typical grease base of the kind shown in the Myers patent is a calcium soap composition containing a stabilizing agent for the purpose of preventing the mineral oil from separating or bleeding out of the grease when a grease is made from the base and oil. For example, calcium stearate commingled with glyceryl monostearate or other fatty acid ester having at least one free hydroxyl group is a representative grease base composition. A grease is made by incorporating such a base with the suitable oil.

The quality of the grease, as well as the quantity of base required, varies substantially according to the method which is used in making a grease from base and oil. This is due to the fact that a good gel structure may be formed to provide a good grease under one set of conditions, while a poor grease will be obtained if another procedure is followed. A typical technique is to dissolve the base in the oil while the oil is heated and then cool the mixture to form the desired gel structure. However, in this case some gel formation takes place during the initial stage of cooling but as cooling is continued some of the base separates physically from the solution as a fine dispersion instead of as a gel, and when this occurs the full body of the grease may not be produced. This difficulty can be avoided by using more base in proportion to the oil but only at increased cost.

It also has been known that a better gel structure is obtained when the mixture of base and oil is chilled more rapidly as, for example, by passing the mixture over a chill roll. However, special roll equipment is required and the procedure is more costly to employ.

I have found that full bodied greases having better gel formation can be made in a simple and very economical way by cooling the warm solution of grease base dissolved in oil to a point at which the gel formation occurs and then paradoxically, heating the composition. The first step, the cooling, starts the gel formation; the second step, the heating, favors completion of the gel formation; and the product in its final form is a stable, full-bodied grease which is clear and transparent and considerably firmer than it would be were the heating step not utilized.

The reasons for these phenomena are not clearly understood. It has always been believed that rapid cooling was a very desirable step and the efforts in grease making practice have been to provide more efficient cooling methods. The theory has been that heating tends to destroy gel structures. It appears, however, from the results which I have had that the constituents of a grease can exist in the commingled state as a solution, a gel or a dispersion. If the temperature is high enough the components exist in the form of a solution; if low enough the components exist in gel relationship. The solubility of the components is decreased by a decrease in the temperature; yet a true grease has both the characteristics of a solution, insofar as transparency is concerned, and also characteristics of a gel by which the desired body is attained. One explanation which may be proffered to account for the difficulties which have been encountered is that only a part of the base is utilized to form a gel when the solution is cooled and particularly when the solution is cooled slowly, while the rest separates in a fine, dispersed form.

We know now, however, that when the solution is cooled to the point where gel formation begins and then heated the final product is both clear and transparent and also firm, smooth and stable. Reheating the composition in which gel formation has started accomplishes this result.

It may be that part of the base is present as a fine dispersion in the oil after the solution has been cooled. If this is the case, this dispersed portion of the base absorbs oil when the mass is heated and thereby changes to the gel state. It usually is not sufficient merely to reheat the mass momentarily after gel formation has started to occur and then permit it to cool; instead, the mass should be held at the higher temperature for a considerable period of time, usually for at least an hour, in order to permit the grease to develop its full body. This fact, coupled with the fact that the rate at which the body is developed varies somewhat in proportion to the temperature, tends to support the proposition that any base present in the dispersed form reabsorbs oil to form a gel.

In the preferred practice of this invention the grease base is dissolved in oil at a temperature varying from about 120° to 160° C. In using the term "cooling" throughout this specification I do not mean to designate cooling to a very low temperature but to a temperature of about the normal room temperature, say, 25° to 30° C.; the precise temperature is not critical and varies with the nature of the base, the nature of the oil and the proportions. Next, heat is applied to the mass sufficient to raise it to a temperature somewhere within the range of approximately 40° to 90° C., that is, sufficient to raise it from about 10 to 60 centigrade degrees above the temperature at which it was cooled. The mass is held at such temperature for a period of time sufficient to permit firm gel structure to form.

As indicated previously, temperature plays an important part upon the rate at which the body develops. However, the temperature should not be much above the upper limit indicated, otherwise coarse, grainy greases are likely to be formed. Also, the temperature to which the mass is heated always should be substantially below the temperature at which the solution of base and oil was formed, otherwise the composition will melt and the gel structure be destroyed.

As a practical matter, it has been determined that desirable results are obtained when a solution which has been cooled to a temperature of about 25° to 30° C. is reheated to a temperature af about 45° or 50° C. It is also to be observed that with certain types of oil and certain types of bases the temperature may be higher than 90° C. or lower than 40° C. Satisfactory results are not obtained when the mixture is cooled from the high temperature at which the solution of base and oil is formed to a temperature of around 25° to 30° and then merely held at this point without any reheating.

During the period in which the body of the grease is being developed by reheating the mixture should not be worked since this tends to break the gel and give a thin and unstable grease. However, after the full body of the grease has been reached it can be worked without interfering with the body. In fact this treatment is desirable inasmuch as the "worked" consistency is the consistency which is critical when the grease is used.

In the preferred practice of the invention greases are made in a simple jacketed kettle fitted with an agitator, provisions being made to furnish steam or cold water to the jacket. The desired amounts of oil and the grease base are placed in the kettle, the grease base is dissolved in the oil at a temperature of approximately 120° to 160° C., and mixing is continued until a clear solution is obtained.

Cold water, or a suitable refrigerant, is then introduced into the jacket and the mixture is cooled with constant agitation to about normal room temperature. At this stage the mass is somewhat opaque in appearance and has the consistency of a viscid liquid or soft grease, depending upon the rate of cooling and percentage of grease base used. The full body of the grease is then devolped by discontinuing the cooling and actually heating the mixture to a temperature within the range previously described, and allowing the mixture to stand at this temperature. Agitation may be continued during reheating until the predetermined temperature is reached, but then agitation should be discontinued. The time required for the grease to develop its full body is, within limits, inversely proportional to the temperature to which the grease has been reheated, that is, the higher the temperature the shorter the time. When the full body of the grease has been reached it is cooled or permitted to cool to room temperature and preferably is worked slightly before being transferred to containers.

It is an advantage of the process that no special equipment is required and the procedure can be carried out by unskilled help. If, for any reason, it is desired to reprocess the grease the mixture may be heated to the point at which the composition melts, then more oil or more base may be added as necessary and the composition processed as before.

It is also practical to cool the solution in the usual manner, to approximately room temperature, transfer it to containers, then reheat the grease by placing the containers in a heated room or cabinet for several hours or more until the full body of the grease is developed. This method is useful particularly when grease is to be packaged in small containers, inasmuch as the mixture in which gel formation has started but has not been completed is usually thin enough to flow into containers. The grease having its body developed in such containers will have a smooth surface and be clear and transparent due to the absence of air bubbles.

The following examples illustrate the use of the invention in making several typical greases but it is to be understood that the invention is not limited to these examples.

*Example 1*

To 925 parts of 100 viscosity Mid-Continent oil are added 75 parts of a grease base consisting of a mixture of calcium stearate and glyceryl monostearate in the ratio of approximately 6 parts calcium stearate to 1 part glyceryl monostearate.

The grease base and the oil are heated together at 160° C. in a small steam jacketed kettle fitted with an agitator. Heating and agitation are continued until all foaming ceases and a clear solution is obtained. This usually requires about 30 minutes at a steam pressure of 80 lbs. in the jacket. The steam is then shut off and cold water is introduced slowly into the jacket and agitation is continued until the mass in the kettle is cooled to about 25° C. At this stage the mass may be cloudy and only semi-fluid. Cooling is then stopped and the mass carefully reheated to 45° C. Agitation is then stopped and the grease is allowed to stand at this temperature for about 2 hours. During this time thickening occurs and a full bodied grease is developed at the end of the period. The grease is then cooled, with agitation, to room temperature and placed in containers.

Such a grease is of medium consistency with a smooth, adhesive, buttery texture and good body, and the grease I made following this procedure had a worked penetration, by the ASTM method, of 374.

*Example 2*

To 900 parts of 100 viscosity Mid-Continent oil are added 100 parts of a grease base of the kind described in Example 1.

The grease base is dissolved in the oil and the solution cooled to 25° C. as in the previous example. Then the mass is transferred to containers and placed in a thermostatically controlled electric oven heated to 45° C. The consistency of a grease I made by this procedure was noted from time to time and after 3 hours had reached its maximum body. The containers were then removed and allowed to cool to room temperature. The resulting grease had a medium-hard consistency and smooth, buttery texture and was free from air bubbles. The surface of the grease was smooth and lustrous and the freedom from air bubbles gave it the maximum degree of transparency. The ASTM worked penetration was 297.

In place of the grease base shown in these examples other bases may be used having different ratios of metallic stearate to glyceryl monostearate, the proportions being varied depending upon the paraffinic or naphthenic characteristics of the oil.

Having described my invention, I claim:

1. The method of making a grease which comprises dissolving a grease base comprising a calcium soap of a saturated fatty acid in grease forming proportions and a polyhydric alcohol ester of a higher fatty acid which ester has at least one free hydroxyl group, in a lubricating oil, cooling the solution to approximately room temperature and thereafter heating the composition and maintaining it at a temperature of 40 to 90° C. for a period of time sufficient to cause any grease base which is in a dispersed condition in the mixture to absorb oil and form a gel therewith.

2. A method of making a lubricating grease of the clear, anhydrous type from a lubricating oil and a grease base comprising calcium stearate in grease forming proportions and a polyhydric alcohol ester of a higher fatty acid, which ester has at least one free hydroxyl group, said method comprising mixing the oil and the grease base at a temperature at which the oil dissolves the grease base, lowering the temperature of the mixture to substantially room temperature, then elevating the temperature of the mixture but not to such a degree that the oil again dissolves the grease base, and maintaining the mixture at said elevated temperature until the opaque, partial gel turns into a transparent gel.

WILLIAM H. SHIELDS.